(12) United States Patent
Maji et al.

(10) Patent No.: US 11,435,544 B2
(45) Date of Patent: Sep. 6, 2022

(54) BEAM SPLITTER ASSEMBLY AND ANALYZER INCLUDING THE SAME

(71) Applicant: Shimadzu Corporation, Kyoto (JP)

(72) Inventors: Takeshi Maji, Kyoto (JP); Shinya Wakuda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 455 days.

(21) Appl. No.: 16/712,276

(22) Filed: Dec. 12, 2019

(65) Prior Publication Data

US 2020/0249413 A1    Aug. 6, 2020

(30) Foreign Application Priority Data

Jan. 31, 2019 (JP) .............................. JP2019-015999

(51) Int. Cl.
*G02B 7/00* (2021.01)
*G01J 3/02* (2006.01)
*G02B 27/14* (2006.01)
*G01J 3/42* (2006.01)

(52) U.S. Cl.
CPC .............. *G02B 7/00* (2013.01); *G01J 3/0205* (2013.01); *G01J 3/42* (2013.01); *G02B 7/006* (2013.01); *G02B 27/14* (2013.01)

(58) Field of Classification Search
CPC .......... G02B 7/00; G02B 7/006; G02B 27/14; G01J 3/0205; G01J 3/0202; G01J 3/42
See application file for complete search history.

(56) References Cited

U.S. PATENT DOCUMENTS

2004/0008429 A1\* 1/2004 Watson .................. G02B 7/023
359/819

FOREIGN PATENT DOCUMENTS

WO        2018/203363 A1    11/2018

\* cited by examiner

*Primary Examiner* — Ryan D Howard
(74) *Attorney, Agent, or Firm* — Muir Patent Law, PLLC

(57) ABSTRACT

A beam splitter assembly includes a beam splitter, a holder that holds the beam splitter, and a first spacer group arranged between the beam splitter and the holder. The first spacer group includes three first spacer pieces. Each of the three first spacer pieces includes a first optical element holder and a first positioning portion. The holder includes three first spacer piece acceptance recesses. Each of the first spacer piece acceptance recesses is in a shape corresponding to the first positioning portion. The three first spacer pieces are accommodated in the three first spacer piece acceptance recesses, respectively. The first optical element holder of each of the three first spacer pieces abuts on the beam splitter.

7 Claims, 6 Drawing Sheets

BEAM SPLITTER ASSEMBLY AND ANALYZER INCLUDING THE SAME

BACKGROUND OF THE INVENTION

Field of the Invention

The present invention relates to a beam splitter assembly and an analyzer including the same.

Description of the Background Art

A spectrophotometer such as a Fourier transform infrared spectrophotometer (FT-IR) includes a beam splitter. In the FT-IR, light emitted from a light source is reflected by a fixed mirror and a moving mirror through a beam splitter. Light reflected by the fixed mirror and light reflected by the moving mirror interfere with each other and a sample is irradiated with interfering light.

In order not to disturb a wave front of reflected light, a beam splitter requires surface accuracy not higher than $\frac{1}{10}$ of a wavelength that is adopted. In an example where a wavelength of 1 µm is adopted, surface accuracy should be not higher than 0.1 µm. The beam splitter is normally held at a certain position by a holder. Though the holder is generally made by cutting, surface accuracy of cutting is as low as several ten µm. Therefore, when the beam splitter is fixed to the holder as being in surface contact, the beam splitter deforms in conformity with an element holder and surface accuracy becomes poor. In order to use a holder made by cutting, a technique for maintaining surface accuracy of a beam splitter, without being affected by low surface accuracy of the holder, by interposing a film-shaped spacer made of a resin between the holder and the beam splitter for deemed three-point support of the beam splitter has conventionally been adopted. WO2018/203363A1 describes an example of such a technique.

SUMMARY OF THE INVENTION

The film-shaped spacer described in WO2018/203363A1 is provided with three protrusions protruding toward an inner circumference in an annular main body for deemed three-point support with respect to the holder. An inner diameter of the annular main body should be greater than the beam splitter. Therefore, an outer geometry of a beam splitter assembly including the holder is disadvantageously large.

Attention should be paid also to ease in works for assembly of a beam splitter assembly. An analyzer such as an FT-IR can be implemented by using the beam splitter assembly.

An object of the present invention is to provide a beam splitter assembly that does not have to be made larger in outer geometry and is readily assembled and an analyzer including the same.

In order to achieve the object, a beam splitter assembly based on the present invention includes a beam splitter, a holder that holds the beam splitter, and a first spacer group arranged between the beam splitter and the holder. The first spacer group includes three first spacer pieces. Each of the three first spacer pieces includes a first optical element holder and a first positioning portion. The holder includes three first spacer piece acceptance recesses. Each of the first spacer piece acceptance recesses is in a shape corresponding to the first positioning portion. The three first spacer pieces are accommodated in the three first spacer piece acceptance recesses, respectively. The first optical element holder of each of the three first spacer pieces abuts on the beam splitter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Construction of Analyzer)

Figure 1:
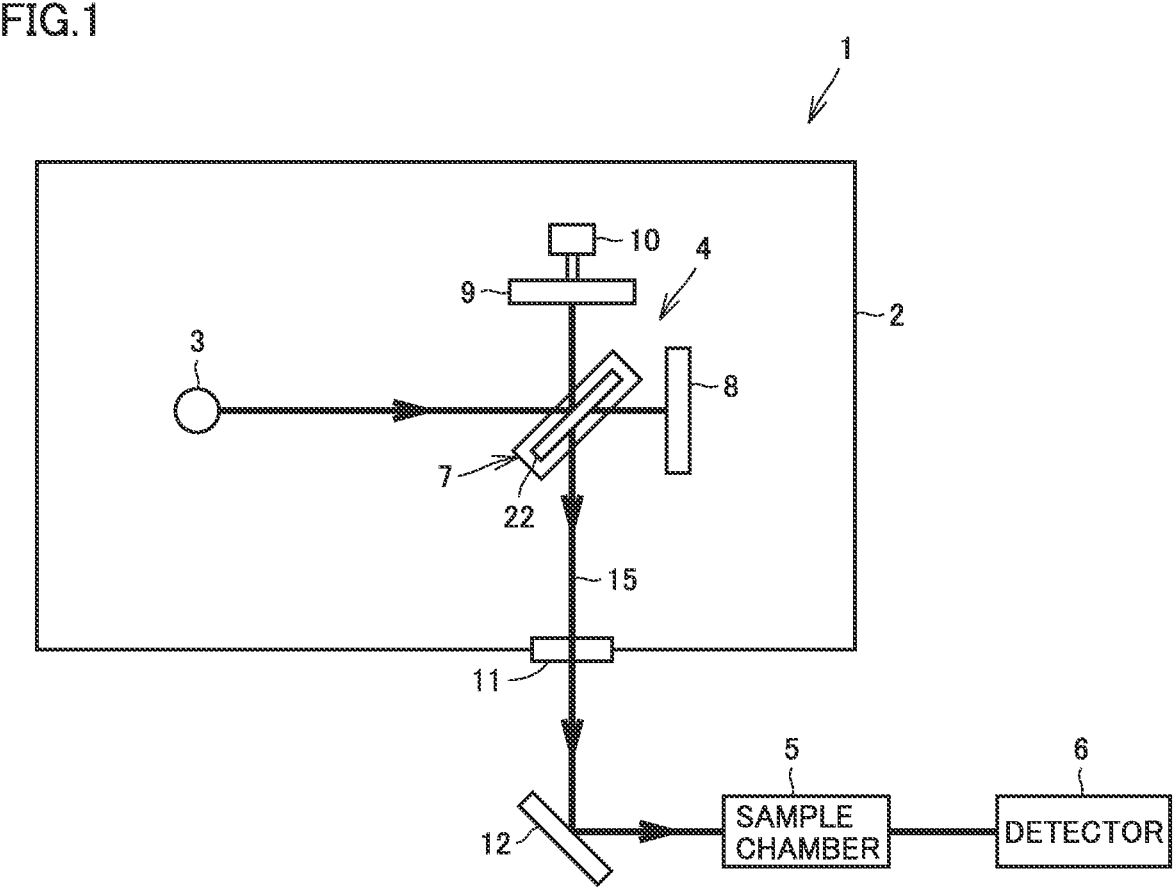
FIG. 1 is a conceptual diagram of an analyzer based on the present invention.

Prior to providing description of a beam splitter assembly in a first embodiment based on the present invention, a construction of an analyzer including the beam splitter assembly will be described. FIG. 1 shows overview of an analyzer 1.

Analyzer 1 is a Fourier transform infrared spectrophotometer (FT-IR). Analyzer 1 includes a housing 2, a heater 3, an interference portion 4, a sample chamber 5, and a detector 6. Housing 2 is formed in a shape of a hollow box. Heater 3 is arranged in housing 2. Heater 3 may be, for example, a ceramic heater. Heater 3 emits infrared measurement light as measurement light, for example, by being fed with a current.

Interference portion 4 is arranged in housing 2. Interference portion 4 is a mechanism for generating infrared interfering light and arranged downstream from heater 3 in an optical path. Interference portion 4 includes a beam splitter assembly 7, a fixed mirror 8, a moving mirror 9, and a driver 10.

Beam splitter assembly 7 is arranged at a distance from heater 3. Beam splitter assembly 7 includes a beam splitter 22. Beam splitter 22 is constructed to reflect some of incident light and to allow passage of remaining incident light. A detailed construction of beam splitter assembly 7 will be described later.

Fixed mirror 8 is arranged opposite to heater 3 with beam splitter assembly 7 being interposed. Fixed mirror 8 is arranged as being fixed at a certain position. Moving mirror 9 is arranged at a distance from beam splitter assembly 7 and fixed mirror 8. Moving mirror 9 is constructed as being movable in a direction in which beam splitter assembly 7 and moving mirror 9 are connected to each other. For example, driver 10 is constituted of a voice coil motor, and constructed to provide driving force to moving mirror 9.

A portion of housing 2 opposed to interference portion 4 is provided with a window 11 for passage of light.

Sample chamber 5 is arranged at a distance from housing 2. Sample chamber 5 is formed in a shape of a hollow box. A sample is accommodated in sample chamber 5. In the optical path, a reflector 12 is arranged upstream from sample chamber 5.

Detector 6 is arranged at a distance from sample chamber 5. For example, an MCT (Hgcdte) detector, a deuterated L-alanine triglycine sulphate (DLaTGS) detector, a triglycine sulfate (TGS) detector, or a deuterium tri-glycine sulfate (TGS) detector is provided as detector 6.

(Operation of Analyzer)

In analysis of a sample by analyzer 1, infrared light is emitted from heater 3. Infrared light then enters beam splitter 22. Some of infrared light incident on beam splitter 22 passes through beam splitter 22 and is incident on fixed mirror 8, and remaining infrared light is reflected by beam splitter 22 and incident on moving mirror 9. Moving mirror 9 is moved by receiving driving force from driver 10.

Infrared light reflected by fixed mirror 8 is reflected by beam splitter 22 and is directed toward reflector 12. Infrared light reflected by moving mirror 9 passes through beam splitter 22 and is directed toward reflector 12. Infrared light reflected by fixed mirror 8 and infrared light reflected by moving mirror 9 are thus synthesized to become infrared interfering light 15. Infrared interfering light 15 is emitted to the outside of housing 2 through window 11 and is directed toward reflector 12. Infrared interfering light 15 is reflected by reflector 12 and enters sample chamber 5. The sample in sample chamber 5 is thus irradiated with infrared interfering light 15. Light reflected from the sample or light that has passed through the sample is emitted from sample chamber 5 and enters detector 6.

Detector 6 outputs an interferogram in accordance with incident infrared light as a detection signal. As the detection signal from detector 6 is subjected to Fourier transform in analyzer 1, the analyzer creates spectrum intensity distribution data. The sample is analyzed based on the data.

First Embodiment

A beam splitter assembly in the first embodiment based on the present invention will be described with reference to FIGS. 1 to 6.

Figure 2:
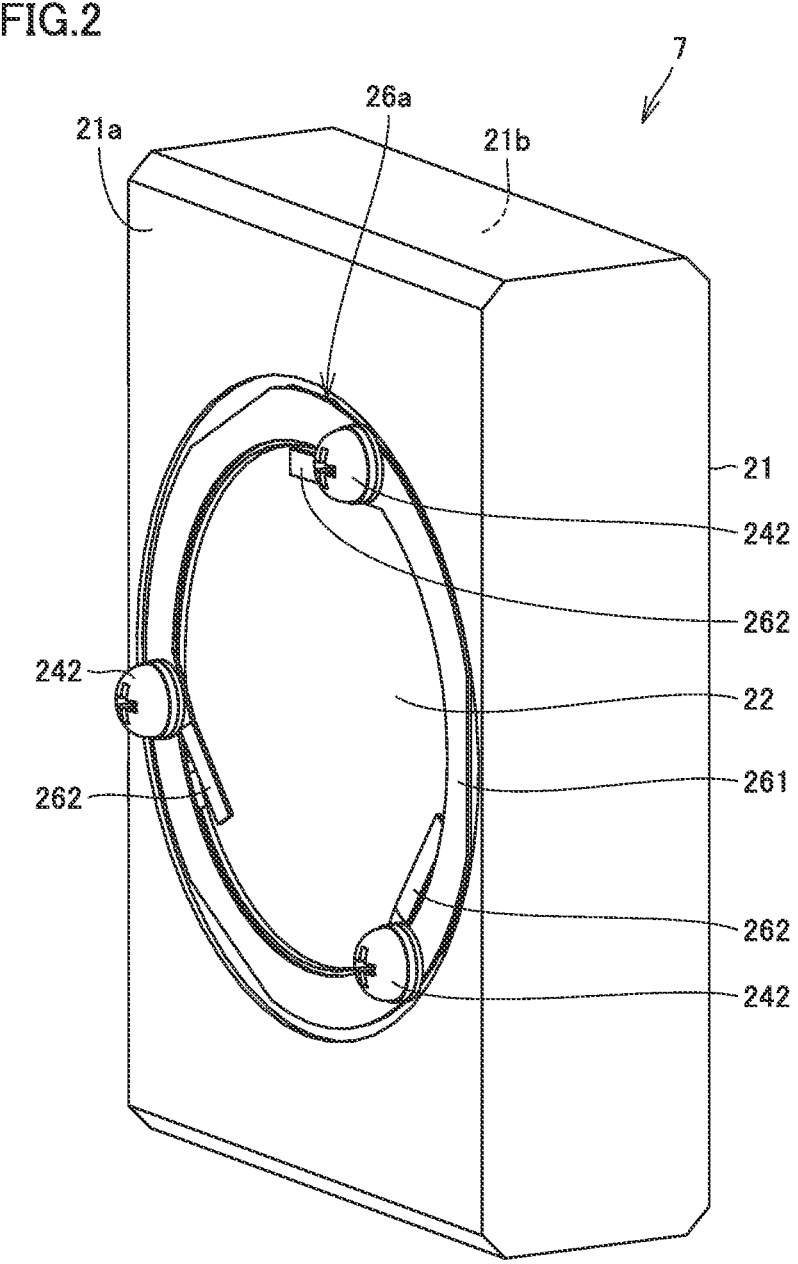
FIG. 2 is a perspective view of a beam splitter assembly in a first embodiment based on the present invention.
Figure 3:
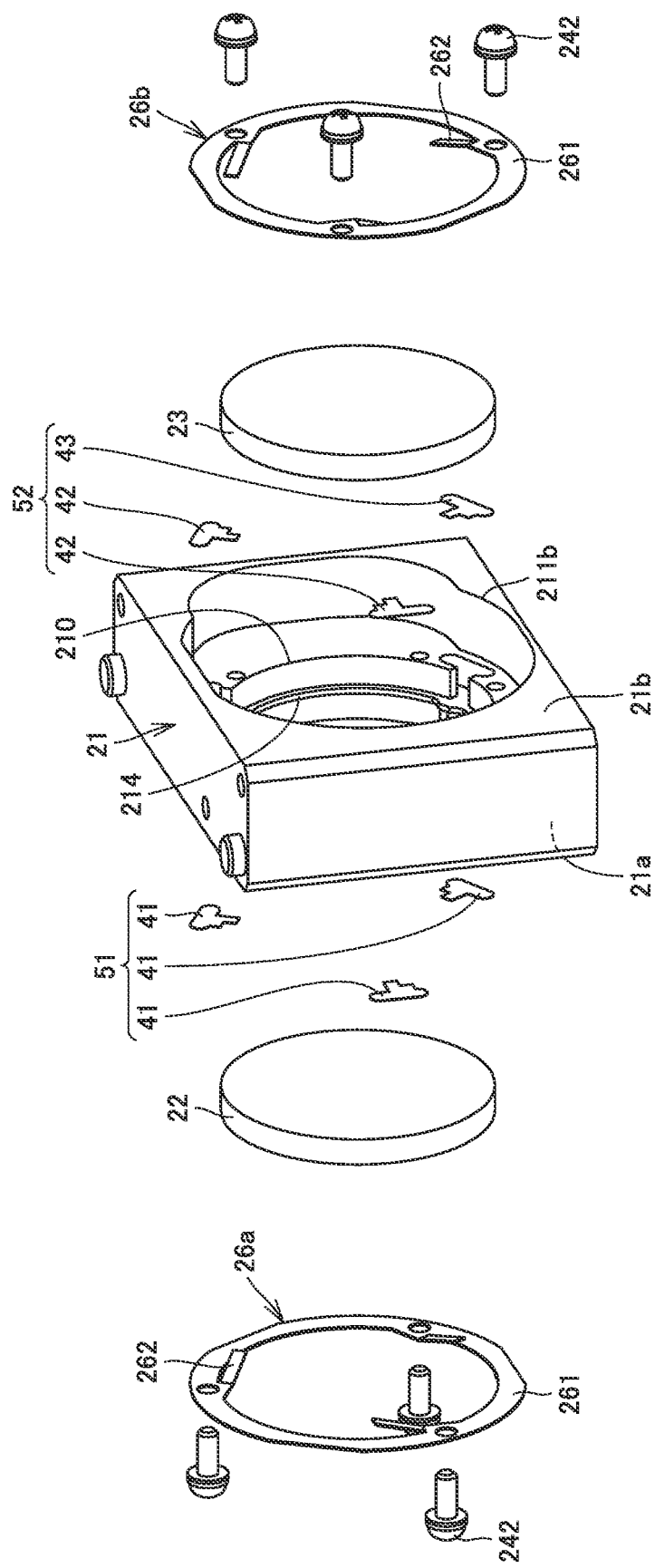
FIG. 3 is an exploded perspective view of the beam splitter assembly in the first embodiment based on the present invention.

FIG. 2 shows a perspective view of beam splitter assembly 7. FIG. 3 shows an exploded perspective view of beam splitter assembly 7.

Beam splitter assembly 7 includes a holder 21, a beam splitter 22, a compensator 23, and a pair of fixing plates 26a and 26b. Holder 21 is formed like a flat plate having a prescribed thickness. Holder 21 includes a first surface 21a and a second surface 21b in front and rear relation. An opening 210 is seen in the inside of holder 21. Beam splitter 22 and compensator 23 are accommodated in opening 210. Beam splitter 22 is composed of a translucent material such as KBr or glass. Beam splitter 22 is in a shape of a disc. Beam splitter 22 is smaller in thickness than holder 21.

Beam splitter 22 is slightly smaller in diameter than opening 210 in holder 21. As shown in FIG. 3, beam splitter 22 is fixed by substantially annular fixing plate 26a. Fixing plate 26a is fixed to first surface 21a of holder 21 by a screw 242. Compensator 23 is fixed by substantially annular fixing plate 26b. Fixing plate 26b is fixed to second surface 21b of holder 21 by screw 242. Each of fixing plates 26a and 26b includes one attachment portion 261 and three protrusions 262 protruding inward. Attachment portion 261 is annular.

Figure 4:
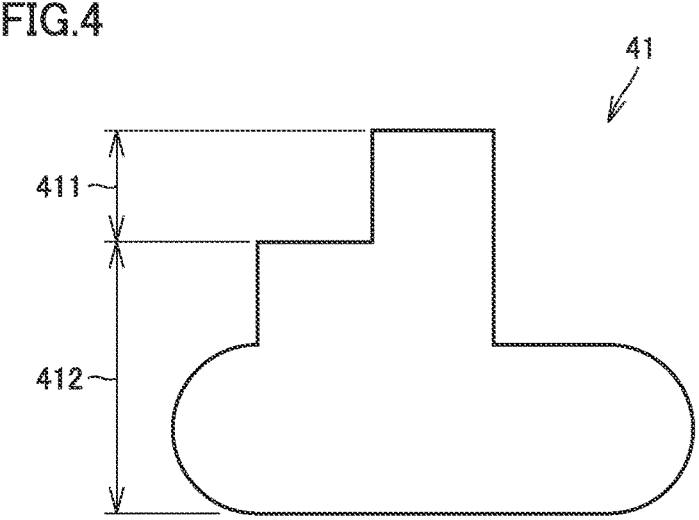
FIG. 4 is a plan view of a first spacer piece included in the beam splitter assembly in the first embodiment based on the present invention.
Figure 5:
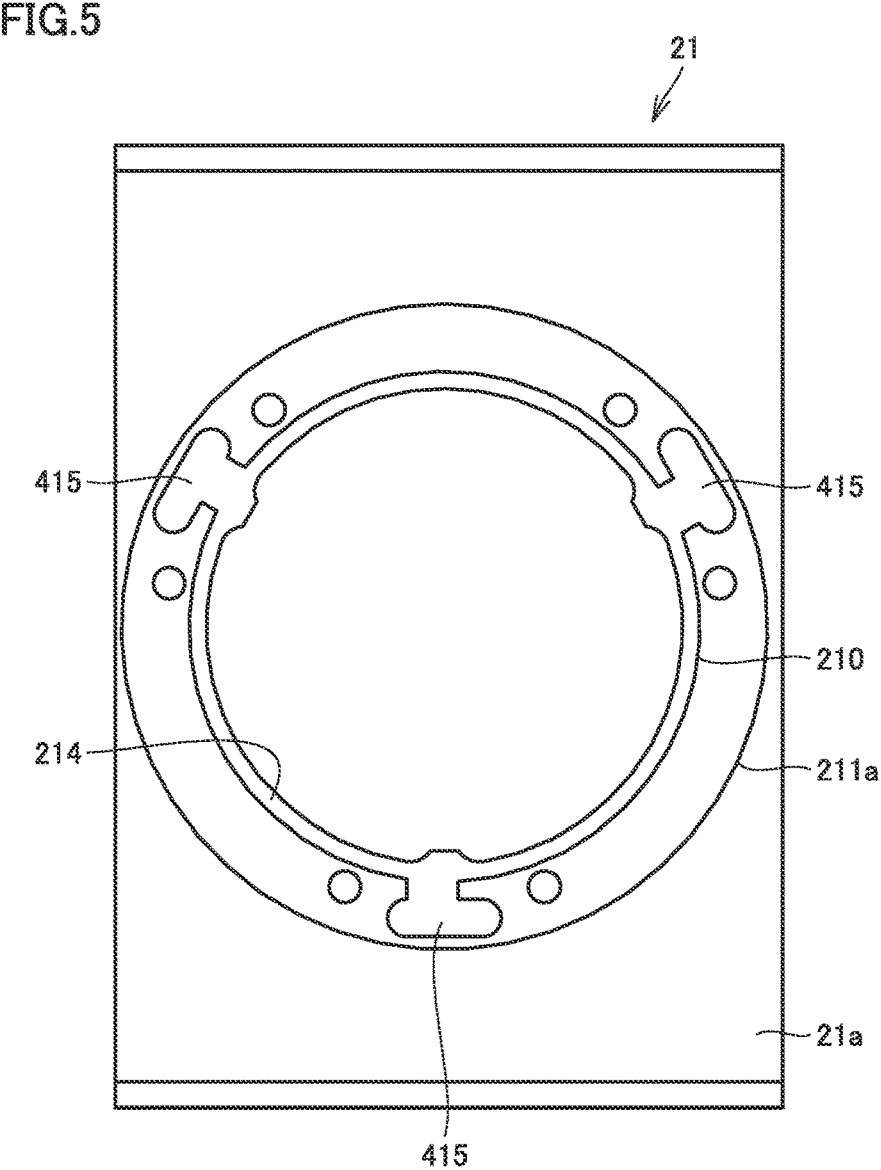
FIG. 5 is a view in a direction with a first surface facing front, of a holder included in the beam splitter assembly in the first embodiment based on the present invention.

Three first spacer pieces 41 as a first spacer group 51 are arranged between beam splitter 22 and holder 21. FIG. 4 shows a plan view when single first spacer piece 41 is taken out alone. FIG. 5 shows holder 21 with first surface 21a facing front. As shown in FIG. 5, a recess 211a is provided in first surface 21a. Recess 211a accepts fixing plate 26a.

Figure 6:
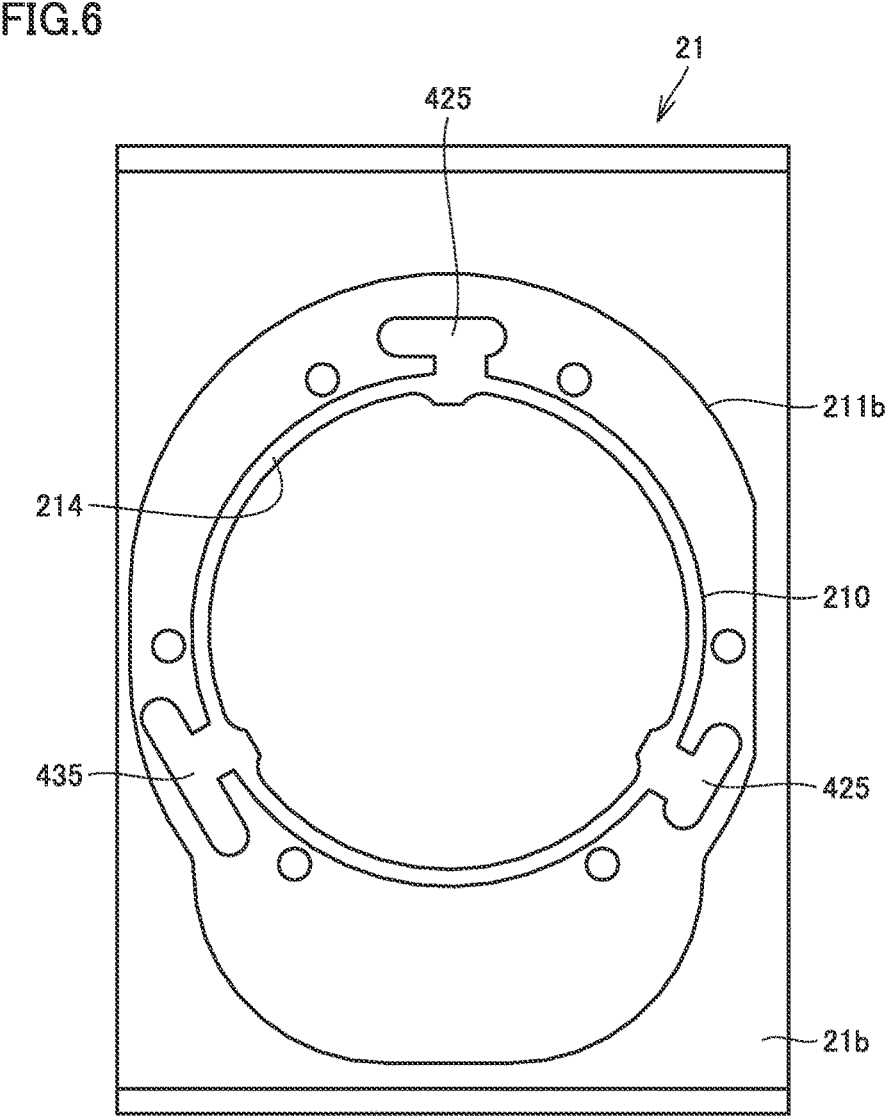
FIG. 6 is a view in a direction with a second surface facing front, of the holder included in the beam splitter assembly in the first embodiment based on the present invention.

FIG. 6 shows holder 21 with second surface 21b facing front. As shown in FIG. 6, a recess 211b is provided in second surface 21b. Recess 211b accepts fixing plate 26b. As shown in FIG. 3, opening 210 is provided to connect a bottom surface of recess 211a and a bottom surface of recess 211b to each other. Opening 210 passes through a central portion of holder 21 in a direction of thickness. A flange 214 is provided around an inner circumferential surface of opening 210. Flange 214 is annular. Flange 214 protrudes from a central portion of the inner circumferential surface of opening 210 toward the center of opening 210. Flange 214 lies between beam splitter 22 and compensator 23.

The construction of beam splitter assembly 7 will be summarized as below, although there may be redundancy of matters described so far.

Beam splitter assembly 7 includes beam splitter 22, holder 21 that holds beam splitter 22, and first spacer group 51 arranged between beam splitter 22 and holder 21. First spacer group 51 includes three first spacer pieces 41. Each of three first spacer pieces 41 includes a first optical element holder 411 and a first positioning portion 412. Holder 21 includes three first spacer piece acceptance recesses 415. Each of first spacer piece acceptance recesses 415 is in a shape corresponding to first positioning portion 412. Three first spacer pieces 41 are accommodated in three first spacer piece acceptance recesses 415, respectively. First optical element holder 411 of each of three first spacer pieces 41 abuts on beam splitter 22. Three first spacer piece acceptance recesses 415 are provided at regular intervals, that is, intervals of 120°.

In the present embodiment, since holder 21 includes three first spacer piece acceptance recesses 415 and three first spacer pieces 41 are accommodated in three first spacer piece acceptance recesses 415, respectively, beam splitter 22 can be supported at three points by first optical element holders 411 of first spacer pieces 41. Therefore, the outer geometry of the beam splitter assembly does not have to be made larger and the beam splitter assembly is readily assembled.

As shown in FIG. 4 in the present embodiment, first positioning portion 412 is preferably in an asymmetric two-dimensional shape. By adopting this construction, erroneous distinction between the front and the rear in insertion of first spacer piece 41 into first spacer piece acceptance recess 415 can be prevented. Though first spacer piece 41 may generally be formed by punching of a material in a shape of a sheet, a finished shape may slightly be different between the front and the rear, depending on a direction of punching. By providing an asymmetric shape, when an attempt to insert a first spacer piece into first spacer piece acceptance recess 415 is made based on erroneous distinction between the front and the rear, the shape of the spacer piece does not conform to the shape of the spacer piece acceptance recess, and a worker can be aware of his/her mistake. Therefore, assembly based on erroneous distinction between the front and the rear can be prevented.

Figure 7:
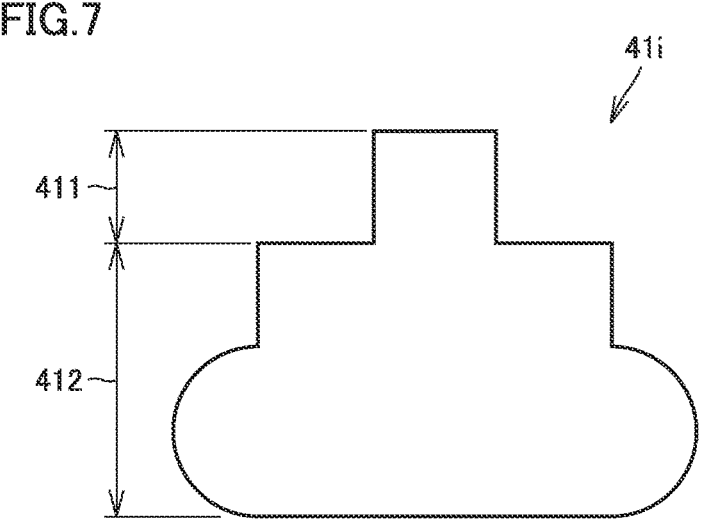
FIG. 7 is a plan view of a modification of the first spacer piece included in the beam splitter assembly in the first embodiment based on the present invention.

The first spacer piece may be in a symmetric shape like a first spacer piece 41*i* shown in FIG. 7, which is also useful because three-point support of beam splitter 22 per se can be achieved. When a shape is symmetric like first spacer piece 41*i*, however, it is difficult to be aware of erroneous distinction between the front and the rear in an assembly work. From such a point of view, an asymmetric shape like first spacer piece 41 shown in FIG. 4 is preferred.

Figure 8:
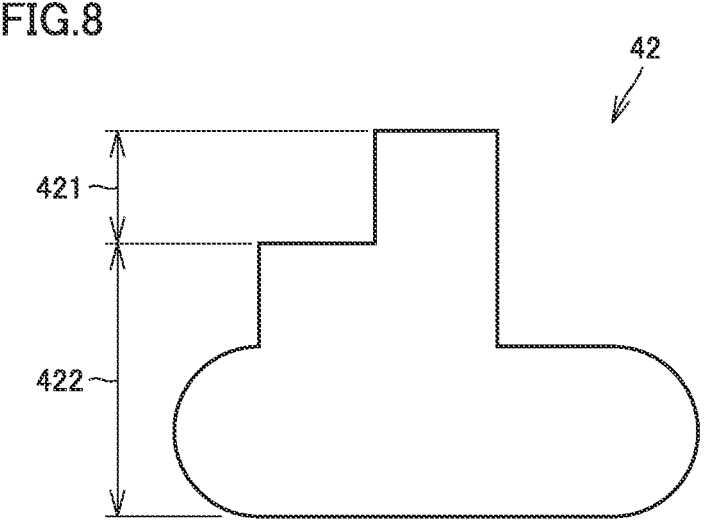
FIG. 8 is a plan view of a second spacer piece included in the beam splitter assembly in the first embodiment based on the present invention.
Figure 9:
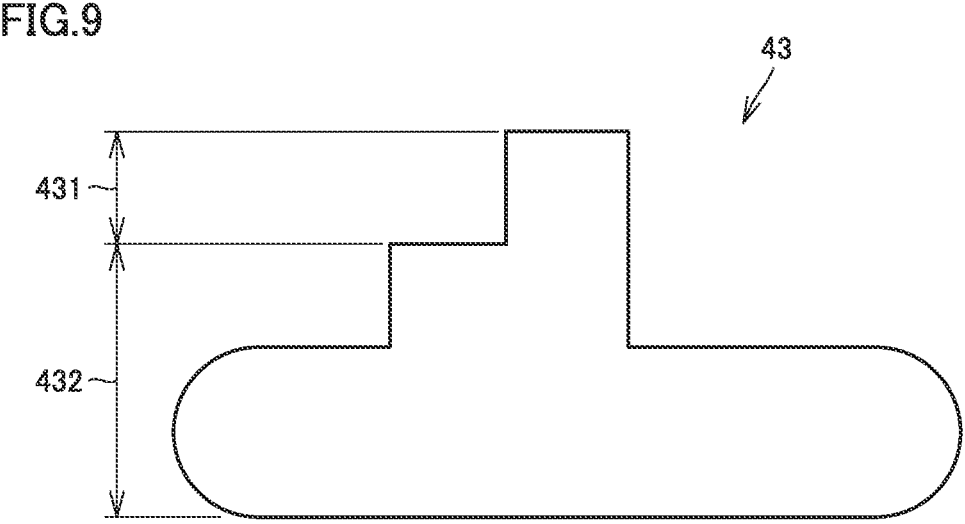
FIG. 9 is a plan view of a third spacer piece included in the beam splitter assembly in the first embodiment based on the present invention.

As shown in the present embodiment, beam splitter assembly 7 preferably includes the construction below. Beam splitter assembly 7 further includes compensator 23 held by holder 21 and a second spacer group 52 arranged between compensator 23 and holder 21. Compensator 23 is composed of a translucent material such as KBr or glass. Compensator 23 is in a shape of a disc. Compensator 23 is smaller in thickness than holder 21. Compensator 23 is slightly smaller in diameter than opening 210 in holder 21. Compensator 23 is substantially equal in diameter to beam splitter 22. Second spacer group 52 includes two second spacer pieces 42 and one third spacer piece 43. FIG. 8 shows a plan view when single second spacer piece 42 is taken out alone. FIG. 9 shows a plan view when third spacer piece 43 is taken out alone.

Each of second spacer pieces 42 includes a second optical element holder 421 and a second positioning portion 422. Third spacer piece 43 includes a third optical element holder 431 and a third positioning portion 432. Second optical element holder 421 and third optical element holder 431 are different from each other in thickness. Second spacer piece 42 and third spacer piece 43 are different from each other in two-dimensional shape. As is clear based on comparison between FIGS. 8 and 9, third positioning portion 432 of third spacer piece 43 is longer in lateral length than second positioning portion 422 of second spacer piece 42. The "lateral" here corresponds to a circumferential direction of recess 211*b* in FIG. 6.

Holder 21 includes two second spacer piece acceptance recesses 425 and one third spacer piece acceptance recess 435. Each of two second spacer piece acceptance recesses 425 is in a shape corresponding to second positioning portion 422. Third spacer piece acceptance recess 435 is in a shape corresponding to third positioning portion 432. Two second spacer pieces 42 are accommodated in two second spacer piece acceptance recesses 425, respectively. One third spacer piece 43 is accommodated in one third spacer piece acceptance recess 435. Second optical element holders 421 of two second spacer pieces 42 and third optical element holder 431 of one third spacer piece 43 abut on compensator 23.

By adopting this construction, compensator 23 can be supported at three points by two second spacer pieces 42 and one third spacer piece 43. In addition, second optical element holder 421 of second spacer piece 42 and third optical element holder 431 of third spacer piece 43 are different from each other in thickness. Therefore, in beam splitter assembly 7, compensator 23 can be held as being slightly inclined with respect to the central axis of holder 21. Thus, with a simplified structure, compensator 23 can be positioned as being slightly inclined with respect to a state completely parallel to beam splitter 22.

Though an example in which third positioning portion 432 of third spacer piece 43 is longer in lateral length than second positioning portion 422 of second spacer piece 42 is shown, this relation may be opposite. In other words, third positioning portion 432 of third spacer piece 43 may be shorter in lateral length than second positioning portion 422 of second spacer piece 42. Not only the positioning portion is different in lateral length but also the positioning portion may be bent or may be provided with a protrusion for identification. Second spacer piece 42 and third spacer piece 43 should only be different from each other in two-dimensional shape. With the different shape, a worker readily distinguishes between second spacer piece 42 and third spacer piece 43 during an assembly work and the assembly work is facilitated.

As shown in FIG. 8 in the present embodiment, second positioning portion 422 is preferably in an asymmetric two-dimensional shape. By adopting this construction, erroneous distinction between the front and the rear in insertion of second spacer piece 42 into second spacer piece acceptance recess 425 can be prevented.

As shown in FIG. 9 in the present embodiment, third positioning portion 432 is preferably in an asymmetric two-dimensional shape. By adopting this construction, erroneous distinction between the front and rear in insertion of third spacer piece 43 into third spacer piece acceptance recess 435 can be prevented.

One of second spacer piece 42 and third spacer piece 43 is preferably identical in thickness and two-dimensional shape to first spacer piece 41. By adopting this construction, the number of types of spacer pieces to be prepared can be decreased and production efficiency is enhanced. First spacer piece 41, second spacer piece 42, and third spacer piece 43 may be formed of a material identical in type.

In supporting beam splitter 22 at three points by first optical element holders 411 included in three first spacer pieces 41, the center of gravity of beam splitter 22 should only be located in the inside of a triangle defined by three first optical element holders 411. If only this condition is satisfied, positional relation among three points at which three first optical element holders 411 support beam splitter 22 may freely be set and the three points do not have to be arranged at regular intervals.

This is also applicable to three-point support of compensator 23 by two second spacer pieces 42 and one third spacer piece 43. The center of gravity of compensator 23 should only be located in the inside of a triangle defined by two second spacer pieces 42 and one third spacer piece 43. If only this condition is satisfied, positional relation among three points at which compensator 23 is supported may freely be set and the three points do not have to be arranged at regular intervals.

As described above, analyzer 1 preferably includes any beam splitter assembly described above.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A beam splitter assembly comprising:
   a beam splitter;
   a holder that holds the beam splitter; and
   a first spacer group arranged between the beam splitter and the holder,
   the first spacer group including three first spacer pieces,
   each of the three first spacer pieces including a first optical element holder and a first positioning portion, the holder including three first spacer piece acceptance recesses, each of the first spacer piece acceptance recesses being in a shape corresponding to the first positioning portion, the three first spacer pieces being accommodated in the three first spacer piece acceptance recesses, respectively, the first optical element holder of each of the three first spacer pieces abutting on the beam splitter.

2. The beam splitter assembly according to claim 1, wherein
the first positioning portion is in an asymmetric two-dimensional shape.

3. The beam splitter assembly according to claim 1, further comprising:
a compensator held by the holder; and
a second spacer group arranged between the compensator and the holder, wherein
the second spacer group includes two second spacer pieces and one third spacer piece,
each of the second spacer pieces includes a second optical element holder and a second positioning portion,
the third spacer piece includes a third optical element holder and a third positioning portion,
the second optical element holder and the third optical element holder are different from each other in thickness,
the second spacer piece and the third spacer piece are different from each other in two-dimensional shape, the holder includes two second spacer piece acceptance recesses and one third spacer piece acceptance recess, each of the two second spacer piece acceptance recesses is in a shape corresponding to the second positioning portion, the third spacer piece acceptance recess is in a shape corresponding to the third positioning portion, the two second spacer pieces are accommodated in the two second spacer piece acceptance recesses, respectively and the one third spacer piece is accommodated in the one third spacer piece acceptance recess, and the second optical element holders of the two second spacer pieces and the third optical element holder of the one third spacer piece abut on the compensator.

4. The beam splitter assembly according to claim 3, wherein
the second positioning portion is in an asymmetric two-dimensional shape.

5. The beam splitter assembly according to claim 3, wherein
the third positioning portion is in an asymmetric two-dimensional shape.

6. The beam splitter assembly according to claim 3, wherein
one of the second spacer piece and the third spacer piece is identical in thickness and two-dimensional shape to the first spacer piece.

7. An analyzer comprising the beam splitter assembly according to claim 1.

* * * * *